Aug. 13, 1929.
Re. 17,401
A. G. M. MICHELL
COOLING SYSTEM
Original Filed June 29, 1923 3 Sheets-Sheet 1
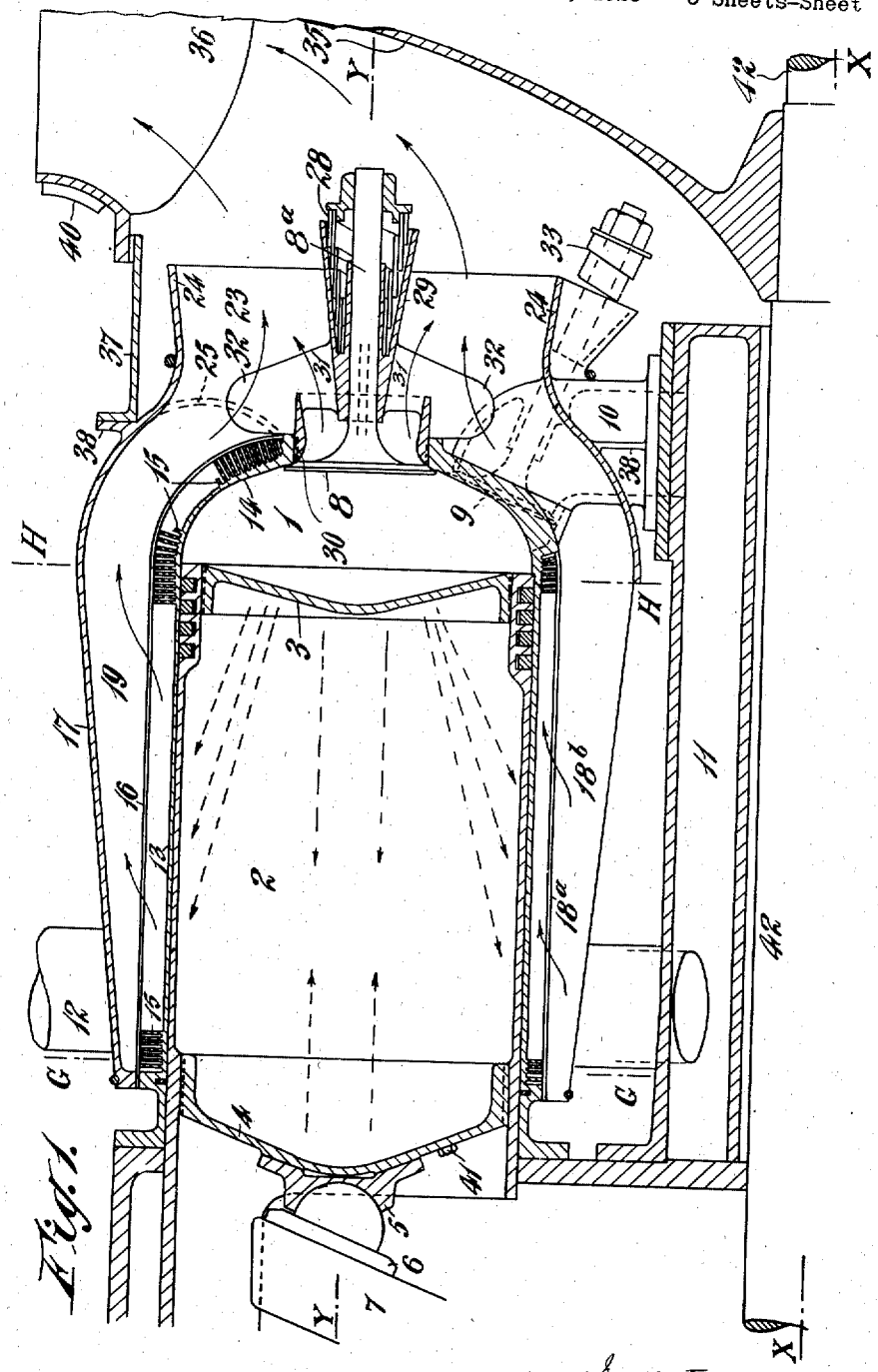
Inventor
Anthony George Maldon Michell
by Henry Orth & Co
Attys Aug. 13, 1929. Re. 17,401

A. G. M. MICHELL

COOLING SYSTEM

Original Filed June 29, 1923 3 Sheets-Sheet 2

Inventor
Anthony George Malden Michell
by Henry Orth & Co
Attys

Aug. 13, 1929. Re. 17,401

A. G. M. MICHELL

COOLING SYSTEM

Original Filed June 29, 1923 3 Sheets-Sheet 3

Inventor
Anthony George Maldon Michell
By Henry Orth Jr.
Atty

Reissued Aug. 13, 1929.

Re. 17,401

UNITED STATES PATENT OFFICE.

ANTHONY GEORGE MALDON MICHELL, OF MELBOURNE, VICTORIA, AUSTRALIA, ASSIGNOR, BY MESNE ASSIGNMENTS, TO MICHELL-CRANKLESS ENGINES CORPORATION, OF NEW YORK, N. Y., A CORPORATION OF NEW YORK.

COOLING SYSTEM.

Original No. 1,621,943, dated March 22, 1927, Serial No. 648,543, filed June 29, 1923, and in Australia July 18, 1922. Application for reissue filed March 22, 1929. Serial No. 349,214.

The purpose of the present invention is to secure more efficient cooling by air currents of the cylinders, pistons and other working parts of machines operating with hot working fluids particularly internal combustion engines, the invention being also applicable to air and other compressors in which the working fluid is heated by compression.

It has been suggested heretofore to employ radiating fins in conjunction with a series of ducts communicating with the atmosphere and the channels between said fins, whereby a plurality of air channels are provided, fed continuously with fresh air, the feed being created either by a fan or suction from the exhaust pressure of the engine.

In the suggestions hitherto advanced for carrying out this method of air cooling the essential factors governing the practical application of same have not been stated or enlarged upon with a view to ascertaining an efficient arrangement of the air channels. By this invention it is sought to achieve same and before proceeding to specify the improvements according to this invention the fundamental considerations in the rational design of an air cooling system will be stated.

The tenor of the calculations is as follows: The main data of the problem are: (A) The quantity of heat which must be dissipated per unit time in order to maintain a steady temperature; (B) the area of surface of the hot body which can be made available for conduction of heat to the air; (C) the difference of temperature between the hot body and the air; (this difference being dependent on the temperature of the air, and the maximum permissible steady temperature of the cylinder or other hot body); (D) the permissible rate at which energy may be expended in moving the cooling air for the purpose of bringing it into contact with the body. (A), (B) and (C) jointly determine the velocity with which air must be caused to flow over the surface of the body, the rate of conduction of heat being known to vary approximately as the three-fourths power of the velocity of the air. This velocity jointly with (D) determines the maximum quantity of air which can be circulated, and the latter quantity jointly with (A) determines a minimum increase of temperature which must be given to the current of cooling air. The ratio of such increase of temperature to the initial difference between the temperatures of the hot body and cooling air determines, from known experimental laws, the ratio of the transverse dimensions of the air channels to their effective length. By "effective length" of an air channel is meant its length in the direction of a stream of air from the place where the stream enters the channel to the place where it leaves.

The velocity and quantity of air, already assigned, jointly determine the total sectional area of these channels while their number and individual dimensions are settled by practical considerations as to economical processes of workmanship having regard to the materials to be applied.

In this way, there are for each class of materials limitations to the appropriate transverse dimensions and effective lengths of the air channels. For the best results it is usually desirable that the ratio of the effective length of the channel to its width should be of the order of 20 or 30 and a leading object of the present invention is to secure such a ratio without incurring difficulties of construction. In the case of cast iron cylinders of ordinary dimensions and as ordinarily constructed the appropriate channels are of comparatively large transverse dimensions and their effective lengths, deduced by the process outlined above, may be such that each channel extends throughout the length or circumference of the cylinder. In the case, however, of cylinders of forged steel or similar materials, such as are chiefly contemplated in the present design, the formation of such relatively large channels is very wasteful and expensive, and channels of relatively small section being adopted, the process of calculation above explained requires the use of channels whose effective length is small in proportion to the length or circumference of the cylinder.

A leading purpose of the present invention is to provide modes of construction and arrangement of air-channels suitable for forged cylinders of internal combusion engines and in accordance with the principles above set forth.

As above stated the ratio of the effective length of such channels to their width or smaller transverse dimensions, is of the order of 20 or 30. In the case of rectangular channels, the depth will be several times greater than the width, the ratio being usually about 5.

In the accompanying drawings Fig. 1 is a sectional view of a portion of an air craft internal combusion engine of the crankless type, described in United States patent specification No. 1,409,057, the section being taken on the lines DEF of Fig. 2 or ABC of Fig. 3 and passing through both the axis XX of the engine shaft, and the centre line YY of one of the cylinders;

Figure 3:
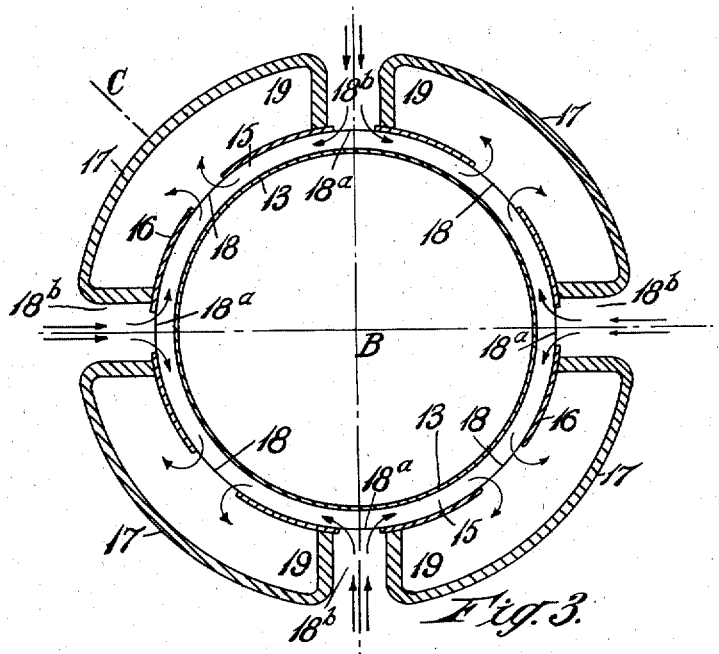
Fig. 3 is a similar cross section on the line H, H of Fig. 1.
Figure 2:
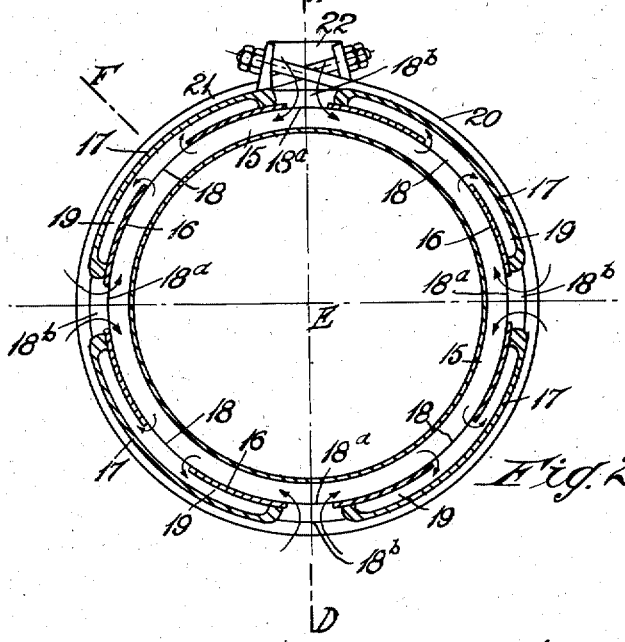
Fig. 2 is a cross section of one of the cylinders on the line G, G of Fig. 1.

As shown in Figs. 1, 2 and 3 the cylinder 1, whose centre-line is YY, contains a piston 2, in the form of a thin cylinder closed by the end-piece 3, and diaphragm 4, the latter carrying the slipper-cup 5 and slipper 6. The latter makes contact with the swash-plate or slant 7, fixed on the shaft 42 whose centre-line is XX.

In these features, and in its general mode of operation the engine is in accordance with Patent 1,409,057 of above cited. Usually several cylinders are arranged circumferentially around the shaft 42, being all equidistant from it. The cylinder 1, is fitted with exhaust valve 8, and induction valve 9 the latter being contained in an induction branch 10 connecting with the induction chamber 11, communicating with main induction pipe 12. The actuating mechanism of the valves, the ignition apparatus and other accessories are not shown, the following description and the drawings being restricted to such matters as are necessary for the clear understanding of the nature of the invention, i. e. the improved means of air cooling.

Figure 4:
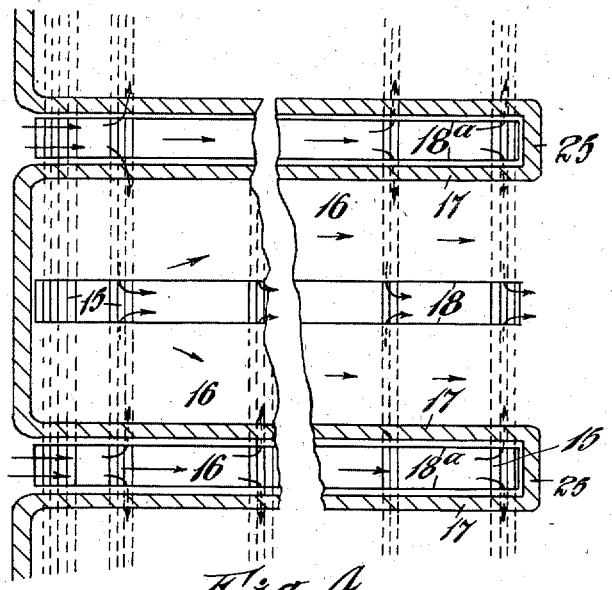
Fig. 4 is a diagrammatic view of air channels.
Figure 5:
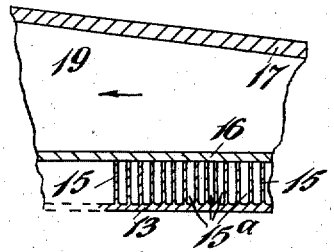
Fig. 5 is a relatively enlarged view showing details of one channel.

The walls 13, 14 of the cylinder 1, and its combustion chamber, are formed as shown in Figs. 1 and 5 with relatively thin and deep circumferential fins 15, (a few only being shown in the drawings) forming between them narrow channels 15[a], the depth of these channels being several times greater than their width. Surrounding these fins 15 is a mantle, comprising a thin shell 16 enclosing the fins, and an external jacket 17, the latter being formed in a number of segments either separate, as shown in Figs. 1, 2 and 3 or connected as shown diagrammatically in Fig. 4. The shell 16 also may either be formed as shown as a separate piece or pieces, or may be made integral with the jacket segments 17. In either case the shell 16 is interrupted by a number of narrow longitudinal slots, 18, 18[a], these being alternately within and without the ducts 19, formed by the shell and the jackets 17. The slots 18[a] are open through the interspaces 18[b] between the jackets 17, to the atmosphere. The jackets and shell may be secured to the cylinder 1, by circumferential screwed bars 20, 21 with saddle-pieces 22 or other suitable means (see Fig. 2).

At the outer end of the cylinder the jacket ducts 19, merge into a common outlet consisting of a circular cowl or short pipe 23, coaxial with the cylinder 1, and surrounding the central exhaust valve 8. The wall 24 of this pipe is continuous circumferentially being formed as a continuation of the peripheral walls of the jackets 17. The interspaces 18[b] are closed at their outer ends by cross walls 25, so that no direct communication exists from the atmosphere into the pipe 23. The ducts 19 on the other hand terminate at the opposite or inner end of the cylinders, being preferably of continuously diminishing radial width in this direction whereby the velocity of the air past the whole of the slots 18 is maintained more or less uniform.

The exhaust valve 8, has its stem 8[a] and spring 28 supported in a cage 29, which is preferably integral with the ring 30 which forms the exhaust port, being united thereto by webs 31, and furnished with wings 32, (which may be formed as extensions of the webs) extending radially beyond the ring 30, into the path of the air flow from the ducts 19 and thereby acting as cooling fins for the exhaust valve casing 29. The spring 33 of the induction valve 9 is external to the pipe 23 as shown (see Fig. 1).

In order to draw an effective current of cooling air through the system of pipe 23, ducts 19, slots 18 and 18[a], and channels 15[a], a fan 35, having blades 36 may be employed. This fan may be mounted directly on the shaft 42, so as to be rotated thereby, and a shroud ring 37 and diaphragm plate 38 may be provided to enclose the pipes 23 of all the cylinders (arranged, as above indicated, in a circumferential series) and thus exclude all means of ingress of air, other than that through the passages above mentioned from the atmosphere to the inlet side of the fan.

The action of the fan in inducing the desired current of air is assisted by the ejector action of the exhaust gases issuing from the ring 30, into the pipe 23, the action of these parts being similar to those of the exhaust nozzle and blast pipe of a steam locomotive.

In some cases the fan may be omitted, the air-current produced by the exhaust being sufficient.

The fan may be utilized for the secondary purpose of carrying balance weights as 40, arranged to co-operate with the slant 7 for effecting mutual dynamic balance with the pistons. On account of the considerable radius of the fan and its axial distance from the centre of the machine, a light weight attached to its periphery is relatively very effective for this purpose, and by this arrangement a large deduction from the weight of the slant otherwise necessary may be made.

In order to effect cooling of the piston, which as above stated is preferably constructed as a thin cylinder and consequently incapable of transmitting heat at a sufficient rate by metallic conduction, it is made fluid-tight by welding or otherwise hermetically joining the end piece 3, and diaphragm 4 to the cylindrical body, and a quantity of a suitable conductive liquid, e. g. mercury is enclosed within it. A plug 41, is provided for introducing this liquid which is thrown from end to end of the hollow piston as the latter reciprocates. The end-piece 3 and diaphragm 4 are respectively made convex and concave on their interior sides, so as to effectively distribute the liquid over the surface of the former and of the cylindrical body of the piston as indicated by the dotted lines in Fig. 1.

The use of mercury in a hollow piston as a cooling agent has been practiced or proposed in connection with cylinders cooled by other methods but the application of such cooling agent has a special appropriateness and function in cooling the head of a long cylindrical hollow piston of the form described, the heat being thus transferred from the head of the piston to its cylindrical wall, and thence to the corresponding wall of the cylinder, the latter being air-cooled throughout its length.

I claim:

1. In a cylinder cooled by circulation of air, multiple channels formed circumferentially around the cylinder and having each a plurality of lateral inlets alternating with a corresponding plurality of lateral outlets for the circulating air, each inlet and outlet slot common to a plurality of channels, the length of each channel between inlet and outlet being many times greater than its smaller transverse dimension.

2. In a cylinder cooled by circulation of air, a plurality of circumferential fins forming between them narrow channels, and a cylindrical shell enclosing the latter and in which is formed a plurality of narrow longitudinal inlet slots alternating with a corresponding plurality of narrow outlet slots, each slot being common to substantially all the channels.

3. A cylinder to be air-cooled having a series of narrow circumferential channels formed thereon, longitudinal air ducts transverse to said channels, and a cylindrical covering shell formed with a series of longitudinal slots making communication between the channels and the air ducts.

4. In a cylinder cooled by circulation of air, a plurality of circumferential fins enclosing between them a corresponding plurality of narrow circumferential channels, and a cylindrical shell enclosing the latter and in which is formed a plurality of narrow longitudinal inlet slots and a plurality of narrow longitudinal outlet slots extending across the fins, each of the latter opening laterally into a longitudinal duct conveying the air from such outlet.

5. Means for cooling a plurality of cylinders grouped circumferentially with parallel axes, consisting of a plurality of mantles enclosing each of the cylinders, and through which the circulated air enters radially to each cylinder from the external atmosphere, and from which it is delivered longitudinally into a common outlet casing.

6. The combination of an engine cylinder, a plurality of circumferential fins forming channels surrounding the cylinders, a hollow jacket for the fins, having a plurality of longitudinal slots for admitting air to said channels, said jacket having longitudinal openings in its inner wall between said slots to admit air to the interior of the jacket from said channels.

7. The combination of an engine cylinder, a plurality of circumferential fins forming channels surrounding the cylinders, a hollow jacket for the fins having a plurality of longitudinal slots extending across the fins for admitting air to said channels, said jacket having longitudinal openings in its inner wall between said slots to admit air to the interior of the jacket from said channels, means closing the longitudinal slots at one end, and an outlet casing communicating with the interior of the jacket.

8. The combination of an engine cylinder, a plurality of circumferential fins, forming channels surrounding the cylinders, a hollow jacket for the fins having a plurality of longitudinal slots, each for admitting air to all of said channels, said jacket having longitudinal openings in its inner wall between said slots to admit air to the interior of the jacket from said channels, means closing the longitudinal slots at one end, and an outlet casing communicating with the interior of the jacket, and means for creating a suction in the casing.

9. The combination with an engine cylinder of peripheral cooling fins thereon, a hollow jacket for said fins open at its discharge end and having longitudinal entrance slots and exit slots therein exposing said fins to the interior of said jacket, both slots extending across the fins, and an exhaust fan cooperating with the open end of said jacket.

10. The combination with an engine cylinder, of peripheral cooling fins thereon, a hollow jacket for said fins and having longitudinal entrance slots extending across the fins to supply air to said fins and alternate discharge slots opening into the interior of said jacket, the interior of said jacket constituting longitudinal ducts terminating at a pipe common to the ducts, a fan, a shroud ring inclosing a chamber between said cylinder and fan, an an exhaust valve discharging into said chamber.

11. The combination with an engine cylinder having closely arranged cooling fins thereon; of a thin mantle surrounding said fins and provided with parallel longitudinal slots crossing the fins, and a jacket having portions arranged between the slots in the mantles to form inlet slots for air, said portions connected by cross walls, and a fan to exhaust one end of said jacket, whereby air will enter through the inlet slots into the narrow peripheral channels between said fins and pass only partially around the circumference of the cylinder between the fins, through the slots in the mantle into the interior of the jacket for exhaust by said fan in substantially separate currents.

12. The combination with an engine cylinder having closely arranged peripheral cooling fins thereon; of a thin mantle contacting with the edges of the fins and having longitudinal slots therein extending across the fins, a jacket surrounding the mantle having longitudinal slots also extending across the fins, and chambers covering the slots in the mantle of considerably greater peripheral width than the slots in the mantles.

13. In an air cooled engine, a cylinder having cooling means thereabout, means dividing said cooling means into a plurality of peripherally separated segmental portions, and independent means extending longitudinally of the cylinder substantially throughout the length thereof for conducting cooling air to said segmental portions.

14. In an air cooled engine, a cylinder having cooling means thereabout, means dividing said cooling means into a plurality of peripherally separated segmental portions, and independent peripherally separated means extending longitudinally of the cylinder for conducting cooling air to said segmental portions.

15. In an air cooled engine, a cylinder having peripheral air cooling fins thereon extending around the cylinder, and a plurality of peripherally spaced means extending longitudinally of the cylinder substantially throughout the length thereof for conducting cooling air to segmental portions of said fins.

16. In an air cooled engine, a cylinder having a plurality of circumferential channels formed thereon extending around the cylinder, a plurality of peripherally disposed means having separated portions extending longitudinally of the cylinder substantially throughout the length thereof for conducting air to said channels, and peripherally disposed means having separated portions for conducting the heated air from said channels.

17. In an air cooled engine, a cylinder having a plurality of circumferential channels formed thereon, a plurality of peripherally disposed means having separated portions for conducting air to said channels, and peripherally disposed means having separated portions alternating in location around the cylinder wall with said first named means for conducting the heated air from said channels.

18. In an air cooled engine, a cylinder, a plurality of spaced, substantially parallel cooling fins surrounding the cylinder wall, a plurality of passages extending longitudinally of the cylinder for conducting cooling air to the cylinder wall and fins, and a plurality of passages extending longitudinally of the cylinder for conducting air away from said fins and cylinder wall.

19. In an air cooled engine, a cylinder, a plurality of spaced, substantially parallel cooling fins surrounding the cylinder wall, a plurality of passages extending longitudinally of the cylinder for conducting cooling air to the cylinder wall and fins, and a plurality of passages extending longitudinally of the cylinder for conducting air away from said fins and cylinder wall, said first named passages being arranged alternately around the cylinder with relation to said second named passages.

In witness whereof, I have hereunto set my hand this 21st day of March, 1929.

ANTHONY GEORGE MALDON MICHELL.